(12) United States Patent
Klinga et al.

(10) Patent No.: US 9,172,325 B2
(45) Date of Patent: Oct. 27, 2015

(54) PHOTOVOLTAIC PANEL CARRIER DEVICE

(75) Inventors: Christopher Stephen Klinga, Boulder, CO (US); Scott Franklin, Nederland, CO (US)

(73) Assignee: LUMOS LSX, LLC, Boulder, CO (US)

( * ) Notice: Subject to any disclaimer, the term of this patent is extended or adjusted under 35 U.S.C. 154(b) by 374 days.

(21) Appl. No.: 13/546,776

(22) Filed: Jul. 11, 2012

(65) Prior Publication Data

US 2013/0175231 A1 Jul. 11, 2013

Related U.S. Application Data

(60) Provisional application No. 61/506,923, filed on Jul. 12, 2011.

(51) Int. Cl.
*H02S 30/10* (2014.01)
*H01L 31/042* (2014.01)
*F24J 2/52* (2006.01)

(52) U.S. Cl.
CPC ............... *H02S 30/10* (2014.12); *F24J 2/526* (2013.01); *F24J 2/5211* (2013.01); *H02S 20/00* (2013.01); *F24J 2002/5216* (2013.01); *Y02E 10/47* (2013.01); *Y02E 10/50* (2013.01)

(58) Field of Classification Search
CPC ........ H02S 30/10; H02S 20/00; F24J 2/5211; F24J 2/526; F24J 2002/5216; Y02E 10/50; Y02E 10/47
USPC ............ 211/41.1, 41.14, 41.15, 41.16, 41.18; 136/259, 244, 251, 243; 294/15, 165, 294/166, 167
See application file for complete search history.

(56) References Cited

U.S. PATENT DOCUMENTS

| | | | | |
|---|---|---|---|---|
| 3,827,742 A * | 8/1974 | Holden | ........................... | 294/16 |
| 4,478,450 A * | 10/1984 | Picozza | ........................ | 294/31.2 |
| 4,487,443 A * | 12/1984 | Adamick | ........................ | 294/151 |
| 4,537,838 A * | 8/1985 | Jetter et al. | ........................ | 429/9 |
| 4,881,771 A * | 11/1989 | Sullivan | ........................ | 294/151 |
| 5,544,806 A * | 8/1996 | Anderson et al. | ............. | 229/178 |
| 6,528,718 B2 * | 3/2003 | Yoda et al. | ..................... | 136/251 |
| 7,487,771 B1 * | 2/2009 | Eiffert et al. | ................... | 126/622 |
| 8,156,697 B2 * | 4/2012 | Miros et al. | .................. | 52/173.3 |
| 8,156,994 B2 * | 4/2012 | Armstrong | ..................... | 160/328 |
| 8,227,684 B2 * | 7/2012 | Truman et al. | ................ | 136/251 |
| 8,403,315 B2 * | 3/2013 | Frankel | ...................... | 269/289 R |
| 8,530,737 B2 * | 9/2013 | Buller et al. | ................... | 136/251 |
| 8,752,872 B2 * | 6/2014 | Kent | ................................ | 294/90 |
| 2003/0070368 A1 * | 4/2003 | Shingleton | ................... | 52/173.3 |
| 2003/0150444 A1 * | 8/2003 | Cedenblad | .................... | 126/709 |
| 2006/0243318 A1 * | 11/2006 | Feldmeier et al. | ............ | 136/244 |
| 2009/0120486 A1 * | 5/2009 | Buller | ............................ | 136/246 |
| 2010/0229367 A1 * | 9/2010 | Franklin | ......................... | 29/464 |
| 2011/0108498 A1 * | 5/2011 | Haeberlein | ....................... | 211/4 |
| 2012/0137600 A1 * | 6/2012 | Jenkins | ......................... | 52/173.3 |
| 2012/0137601 A1 * | 6/2012 | Peelman et al. | ............. | 52/173.3 |
| 2013/0061912 A1 * | 3/2013 | Beck et al. | .................... | 136/251 |
| 2013/0087519 A1 * | 4/2013 | Sung | ............................. | 211/41.1 |

* cited by examiner

*Primary Examiner* — Patrick Hawn

(74) *Attorney, Agent, or Firm* — Hoffmann & Baron, LLP

(57) ABSTRACT

A PV panel carrier includes a plurality of elongate members joined by connecting members to form a frame. Each of the connecting members includes a support surface for supporting a portion of a PV panel thereon. Each of the connectors includes a fastening strap extending over the support surface, wherein at least two of the fastening straps are movable between an open position wherein they do not extend over the support surface and a closed position wherein they extend over the support surface to retain a PV panel in the carrier.

13 Claims, 13 Drawing Sheets

PHOTOVOLTAIC PANEL CARRIER DEVICE

This application claims the benefit of priority to U.S. Provisional Patent Application Ser. No. 61/506,923 filed on Jul. 12, 2011, the contents of which are incorporated by reference herein in their entirety.

TECHNICAL FIELD

The present invention relates to a device for carrying a photovoltaic panel, more specifically, the present invention provides a carrier for securing a photovoltaic panel which allows the panel to be easily removed and secured therein.

BACKGROUND

Photovoltaic ("PV") panels, also referred to as modules or solar panels, of the type known in the art typically include a flat planar surface having an array of solar cells which convert solar energy into electricity. These panels may be surrounded by a frame which provides some protection to the edges of the panel and provides a means for mounting the panel to a structure. However, including a frame on each panel increases the manufacturing expense of the panel. Frameless PV panels are available, where the panel is not surrounded by frame members. In such frameless panels, typically through holes may be formed in the panel itself in order to provide a mounting structure so that the panel may be properly secured. Frameless panels while more efficient to manufacture than the framed variety, are also more susceptible to breakage as the edges are not protected.

PV panels are often installed on roofs or tops of structures, and therefore, must be carried up to the installation site, e.g., by way of ladders. For frameless modules this can be a very labor intensive activity since one must be very careful that the panel is not damaged upon transporting it to its final installation point. In addition, PV panels due to their size and weight can be somewhat difficult to hold and transport up a ladder.

Accordingly, it would be desirable to provide a device which both protects a PV panel during its transportation prior to installation and also provides an easy means of carrying the panel, thus overcoming various shortcomings of the prior art.

SUMMARY

According to aspects of the technical disclosure described herein, there is disclosed a PV panel carrier. The PV panel carrier includes a plurality of elongate members joined by connecting members to form a frame. Each of the connecting members includes a support surface for supporting a portion of a PV panel thereon. Each of the connectors includes a fastening strap extending over the support surface, wherein at least two of the fastening straps are movable between an open position wherein they do not extend over the support surface and a closed position wherein they extend over the support surface to retain a PV panel in the carrier.

Additionally, the PV panel carrier can include movable fastening straps securable in the closed position. At least two of the fastening straps can be fixed at both ends to the connector. The movable fastening arms can be secured in a closed position via a pin removeably securable in the connecting members.

According to further aspects of the technical disclosure described herein, there is disclosed a PV panel carrier including a plurality of elongate members joined by connecting members to form a frame. Each of the connecting members includes a support surface for supporting a portion of a PV panel thereon. Each of the connectors includes a fastening device extending over the support surface, wherein at least two of the fastening devices are movable between an open position wherein they do not extend over the support surface and a closed position where they extend over the support surface to retain a PV panel in the carrier.

According to still further aspects of the technical disclosure described herein, there is disclosed a PV panel carrier including four elongate members and four connectors joining the four elongate members to form a frame. Each connector fixedly secures two elongate members to form a corner of the frame, wherein the frame is sized to be generally the same proportionate shape as and larger than a panel to be carried. The frame forms an inner region in which the panel is carried. The connectors each include a support surface that extends toward the inner region, wherein a panel carried by the frame will engage each of the support surfaces. Each of the connectors include a fastening strap extending over the support surface, wherein at least two of the fastening straps are pivotal between an open position and a closed position. In the open position the pivotal fastening strap does not extend over the support surface and in the closed position the pivotal fastening strap extends over the support surface. In this way, when carrying the panel, a corner of the panel will be disposed between the support surface and the fastening strap.

Further, the PV panel carrier includes a frame that surrounds the panel and provides surfaces for holding and fastening additional elements for transporting the PV panel. The disclosed PV panel carrier allows a PV panel to be easily inserted and removed therefrom, while also maintaining the PV panel secured firmly therein until removal is desired.

DETAILED DESCRIPTION

Figure 1:
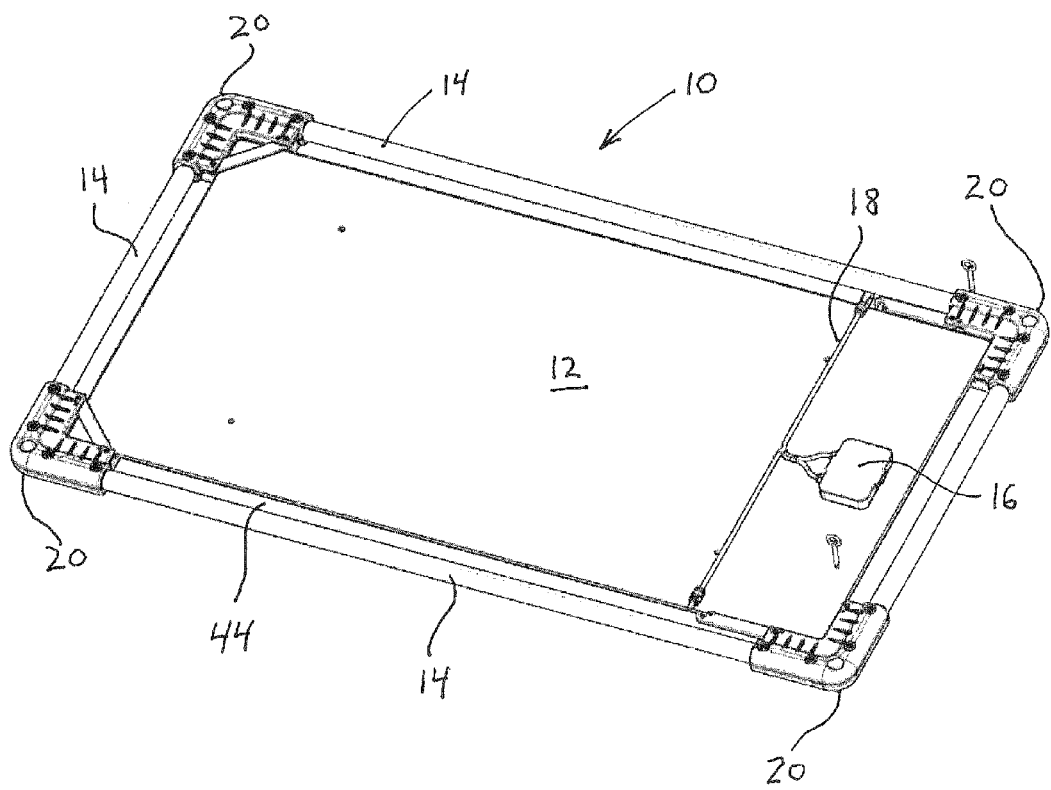
FIG. 1 is a top perspective view of a PV panel carrier including a PV panel secured therein.
Figure 2:
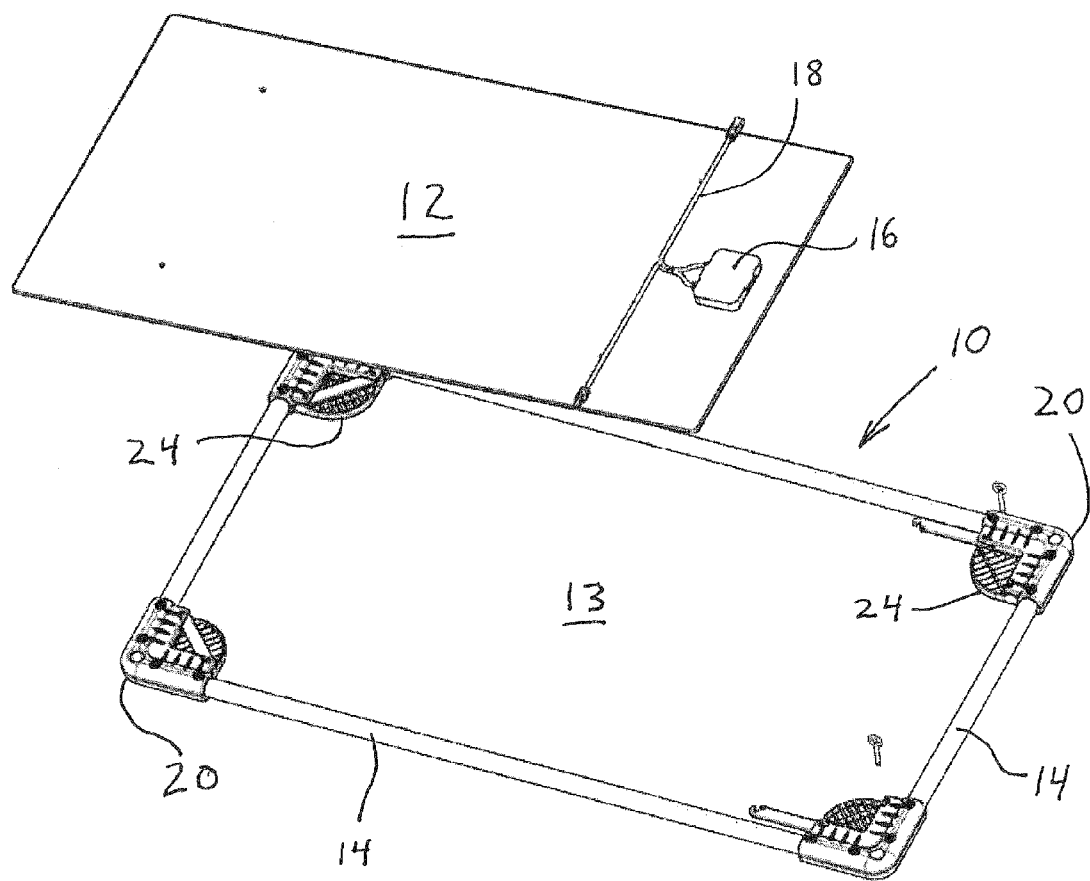
FIG. 2 is a perspective view showing a PV panel carrier and a PV panel separated from the carrier.

The present invention as shown in FIGS. 1 and 2 provides a photovoltaic ("PV") panel carrier 10 into which a PV panel 12 may be securably retained. Once retained, the carrier 10 may be used to transport a PV panel to its installation site.

The carrier 10 may include a plurality of elongate frame members 14 which form a frame having a perimeter similar in configuration to a perimeter of the PV panel 12. The frame members define an interior panel space 13 in which the PV panel may be held. The PV panel 12 may be of a type known in the art, in particular, a frameless PV panel that is a generally thin planar rectangular member, which may include thereon a junction box 16 and associated electrical wiring 18. The PV panel 12 could also be a traditional framed PV module. The carrying device would provide additional damage protection, handling and tie off points. The frame members 14 may be formed of rigid material such as aluminium, steel, polymer or other suitable material known in the art. The frame members 14 may be in the form of rounded tubing, solid bar, or other elongate members having suitable configurations. Alternatively, the frame members 14 and connectors 20 can be integrally formed as a common unitary construction, formed of the same material such as a molded plastic. Further still, one frame member 14 and one connector 20 can be integrally formed as a unitary piece, so that four of such pieces creates a carrier 10. In this way the number of parts can be reduced to four (4) main parts rather than eight.

Figure 3:
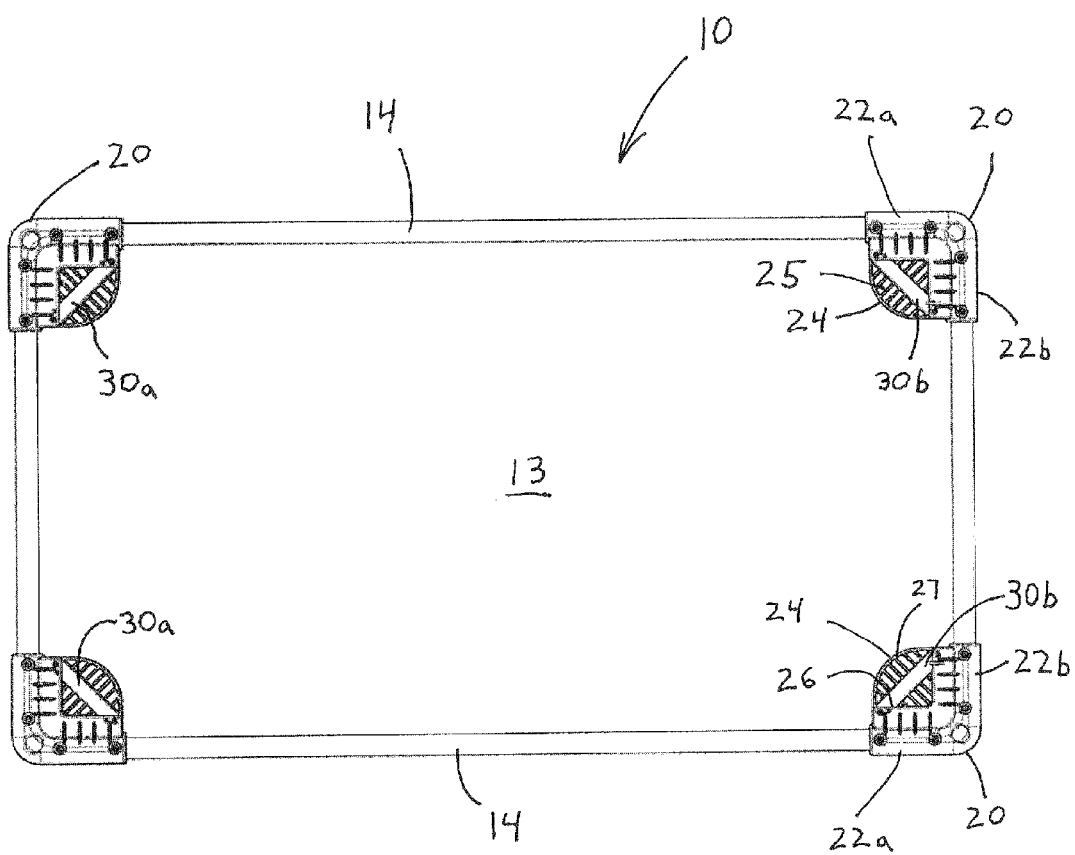
FIG. 3 is a top plan view of the PV panel carrier.
Figure 4:
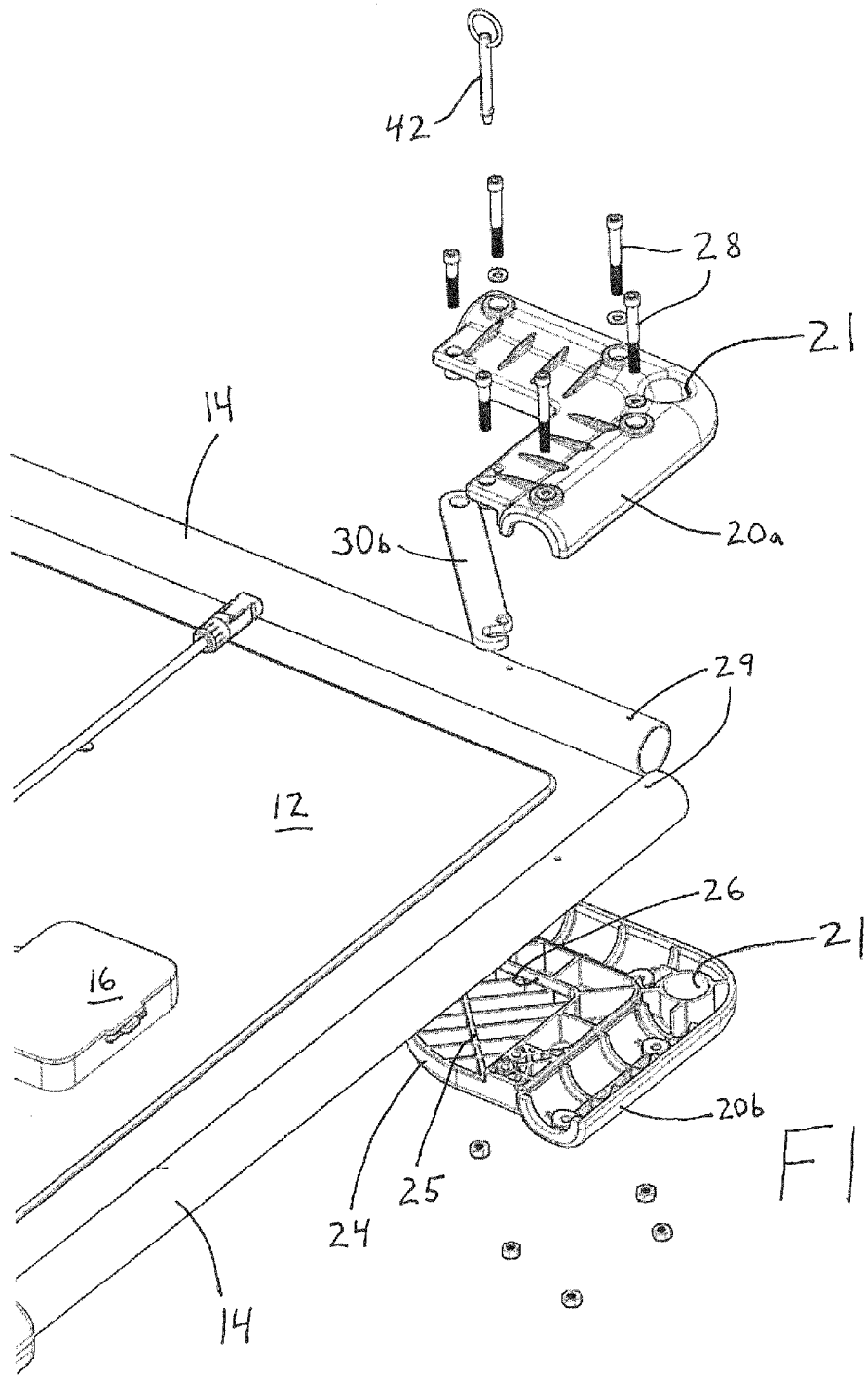
FIG. 4 is a top perspective exploded relief view of a connector in relation to a corner of the PV panel carrier.

Each of the frame members 14 may be joined together at their ends by connectors 20, which in the present embodiment join the frame members at right angles forming a rectangular structure. The connectors 20 form the corners of the carrier 10. Non-rectangular panels could use connectors that have other than a right angle in order to properly conform to the outer perimeter thereof. With reference to FIGS. 3 and 4, each of the connectors 20 may be similarly formed by two connector halves 20a, 20b. The joining portions 22a, 22b of each connector 20 receive the ends of two different frame members 14. The joining portions 22a, 22b may include an inner contour complementary to the outer cross-sectional shape of the frame members 14 such that the adjacent ends of two joined frame members are substantially surrounded or at least sandwiched between the two connector halves 20a, 20b forming the two joining portions 22a, 22b.

Extending inwardly from the joining portions 22a and 22b toward the interior panel space 13 is a shelf 24 having a support surface 25 onto which a corner of the PV panel may rest. The shelf 24 may be partially surrounded on one or more sides by a stop wall 26 that extends perpendicular to support surface 25. At least one stop wall 26 is disposed in each corner of the shelf to contain the PV panel. An inner edge 27 of the shelf 24 does not include an upward extending wall in order to allow the PV panel to lay unobstructed on the shelf and abut the walls 26.

As shown in FIG. 4, the connectors 20 may be formed from multiple pieces 20a and 20b which may be joined together by fasteners 28. The fasteners 28, which may include threaded bolts and nuts, in addition to holding the connectors pieces together, may also extend through frame holes 29 in the ends of the frame members 14. Thus, in addition to securing the components of the connector 20 together also securely fastens the ends of the frame members 14 to the connector 20. The connectors 20 may be rigid structures formed of molded plastic or metal. Alternatively, it is within the contemplation of the present invention that the connectors be light-weight impact absorbing materials.

Figure 5:
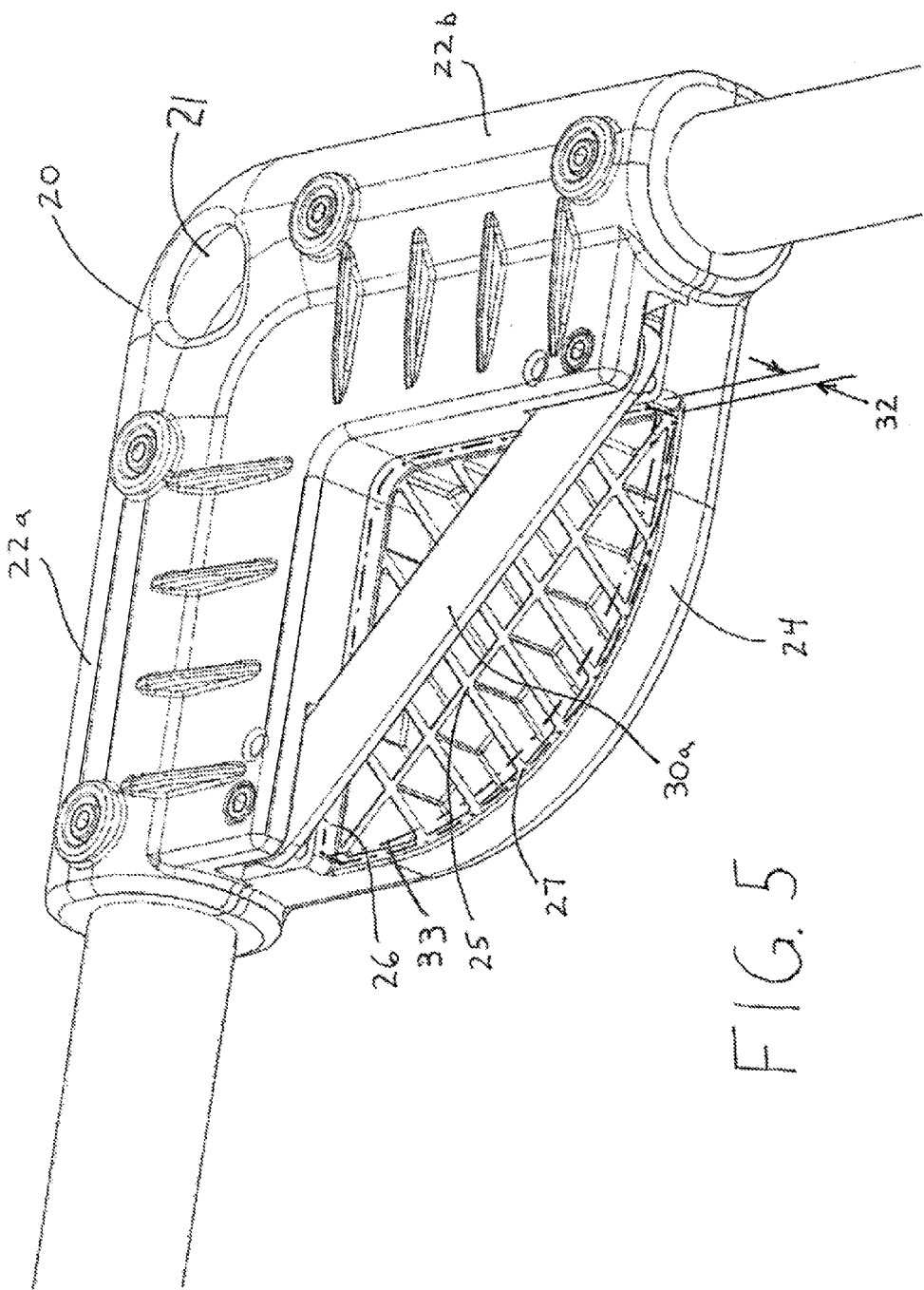
FIG. 5 is detail perspective view of a connector having a fixed fastening strap.
Figure 6:
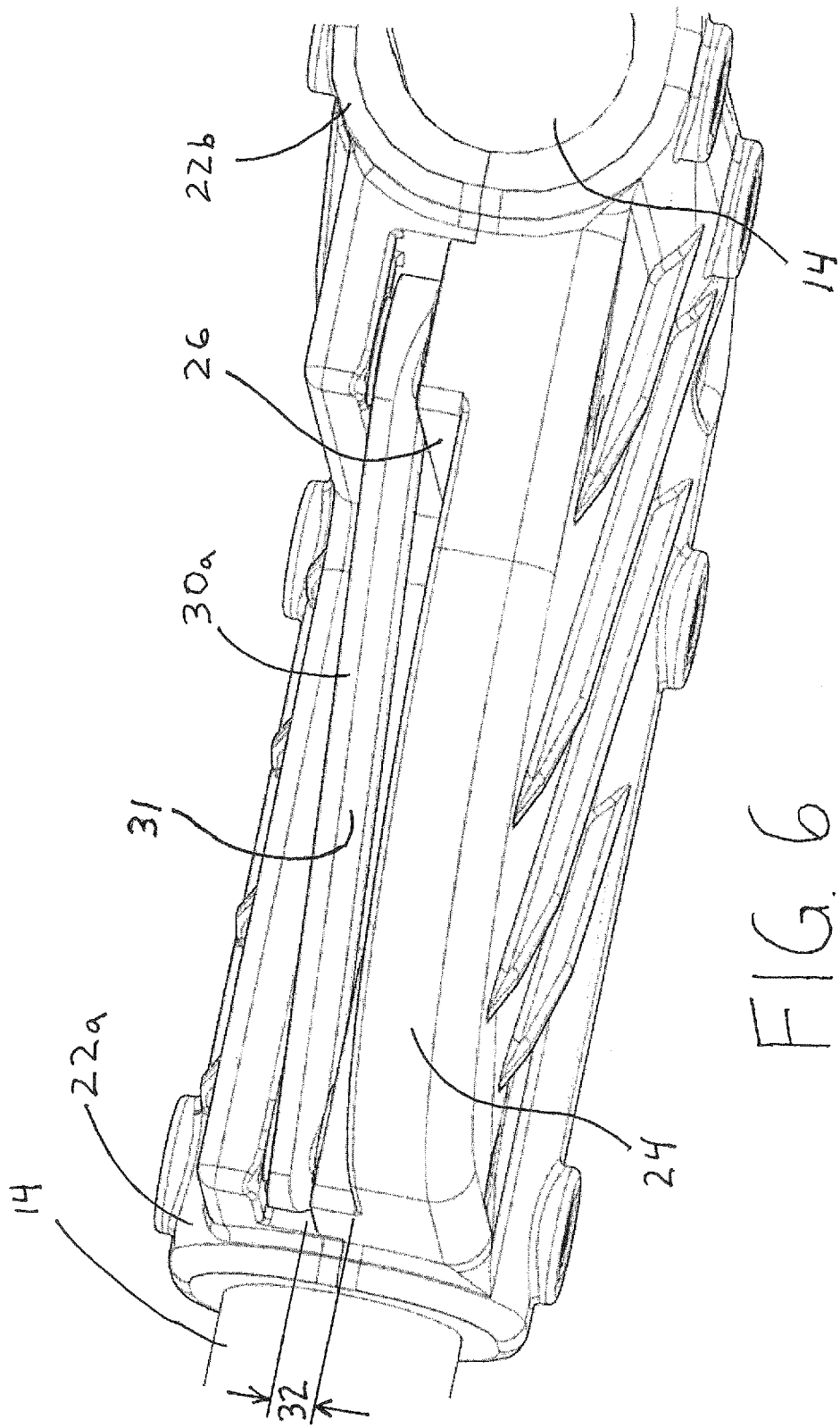
FIG. 6 is a side perspective view of the connector of FIG. 5.

Also, the connectors can each have a tie-off element 21, shown in FIGS. 4 and 5. For example, the connectors can have an aperture 21 that passes through the connector and allows for a rope or cable (not shown) to be inserted therethrough. Such an aperture or tie-off element allows for an installer or person moving the panel 13 to rope-off the carrier 10 to assist in the installation.

The connectors 20, in addition to retaining the frame members 14 together, may also include a fastening device that removably secures the PV panel 12 to the carrier 10. The fastening device may include fastening straps 30a, 30b which secure the PV panel corners to the carrier. In one embodiment, two of the fastening straps 30a may be fixed to the connector 20 and two of the other fastening straps 30b may be pivotably connected to the connector 20 and movable between an open and closed position. The fastening straps 30a, 30b can be rigid bars or optionally much more flexible and stretchable shock cords (i.e., bungee cords). Also, the surfaces of the fastening straps 30a, 30b made to directly engage the panel 12, can be formed of a material or specifically coated to prevent scratching of the panel's surfaces. For example, an insert made of Teflon® or a similar coating could be applied. Similarly, the shelf surface 25 and/or the undersides of the fastening straps 30a, 30b, can have a rubber padding, which further prevents violent shocks or impact forces to the panel 12 in the event the carrier 10 is dropped. Such a rubber pad (not shown) if provided in interchangeable thicknesses could also help ensure a snug fit for the panel 12 within the gap 32 between each support surface 25 and its respective fastening strap 30a, 30b. Further still, such a cushion or rubber pad could cover the stop wall 26 to further protect the thinner side edges of the panel 12.

As shown in FIGS. 3 and 5-7, the fixed fastening straps 30a each extend from one connector joining portion 22a to the other 22b. The fastening strap 30a may extend across the shelf 24 and is offset above it forming a gap 32 in order to allow the corner of the PV panel to be slid into the gap and be held between the fastening strap 30a and the shelf support surface 25. As particularly shown in FIG. 7, the PV panel can be installed by inserting one side edge of the panel into the carrier. In this way, the corners 12a of the PV panel slide into the gap 32 created between the fixed fastening straps 30a and the shelf surface 25. It should be noted that the thicknesses of PV panels may vary depending upon the type of panel. Accordingly, an insert 33, shown in phantom in FIG. 5, may be provided to sit between the PV panel and either the shelf surface 25 or the fastening straps 30a, 30b. The panel corners 12a should be inserted under the fixed fastening straps 30a until the one initially installed side edge of the PV panel 12 abuts the stop wall 26 at the back of the shelf 24. In doing so, the PV panel 12 may need to be fully pivoted down into the frame 10. Thus, panel corners 12b would engage the shelf surfaces 25 on the opposite side of the frame. Also, the fastening straps 30a, under which the panel 12 is initially inserted for mounting on the connectors 20, can have bevelled edges 31, shown in FIG. 6. Such bevelled edges 31 make room for the tilted panel 12 as it is being inserted.

It is also contemplated that the carrier 10 may be configured to hold a plurality of PV panels 12. The panels 12 may be placed one on top of the other and the gap 32 may be sized to accommodate the increased thickness of the stacked panels. One or more inserts 33, may be used to take up space between the strap and the shelf surface 25 when less than the maximum number of panels are being held in the carrier.

Figure 8:
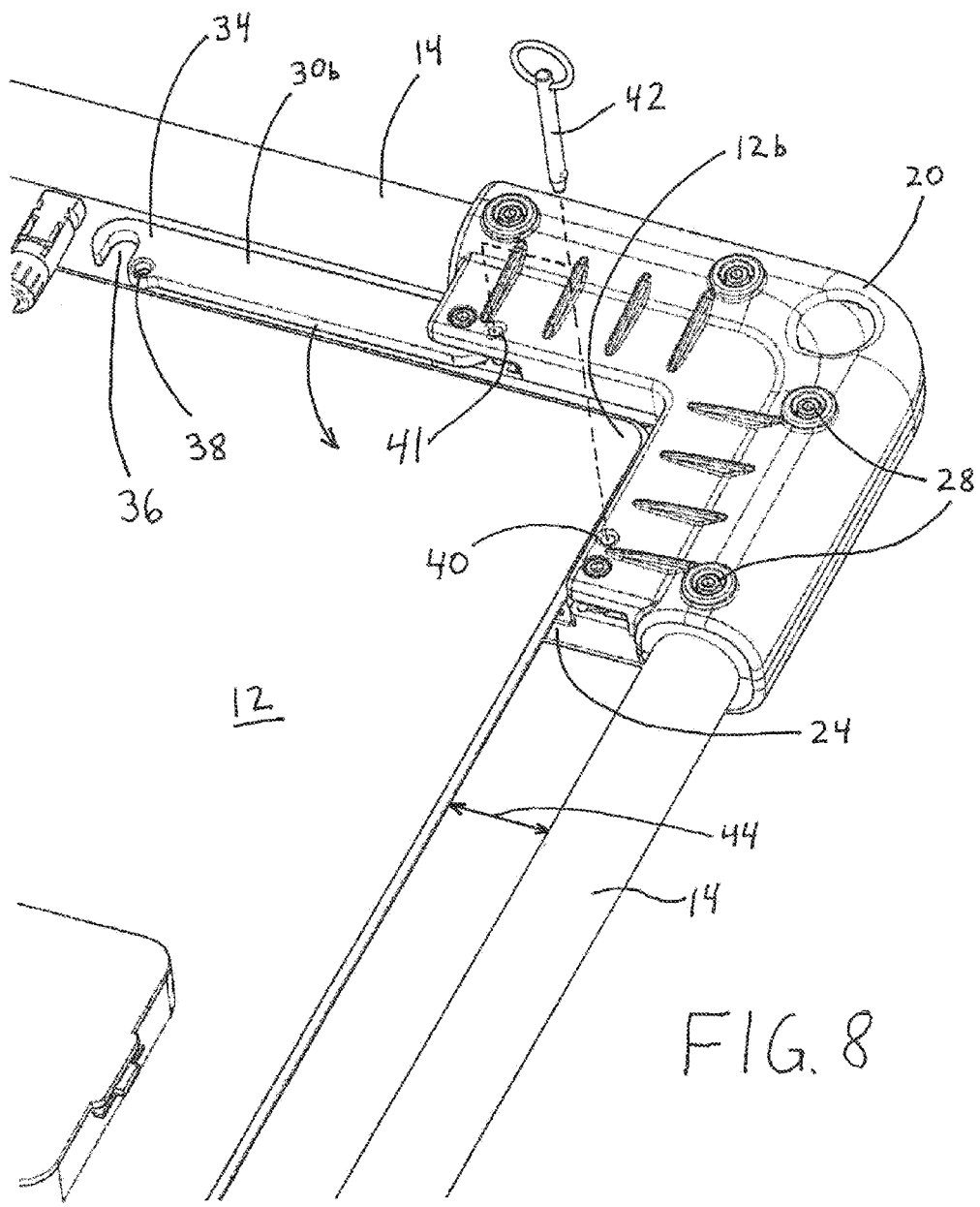
FIG. 8 is a detail perspective view of a connector having a movable fastening strap, with the fastening strap in the open position.
Figure 9:
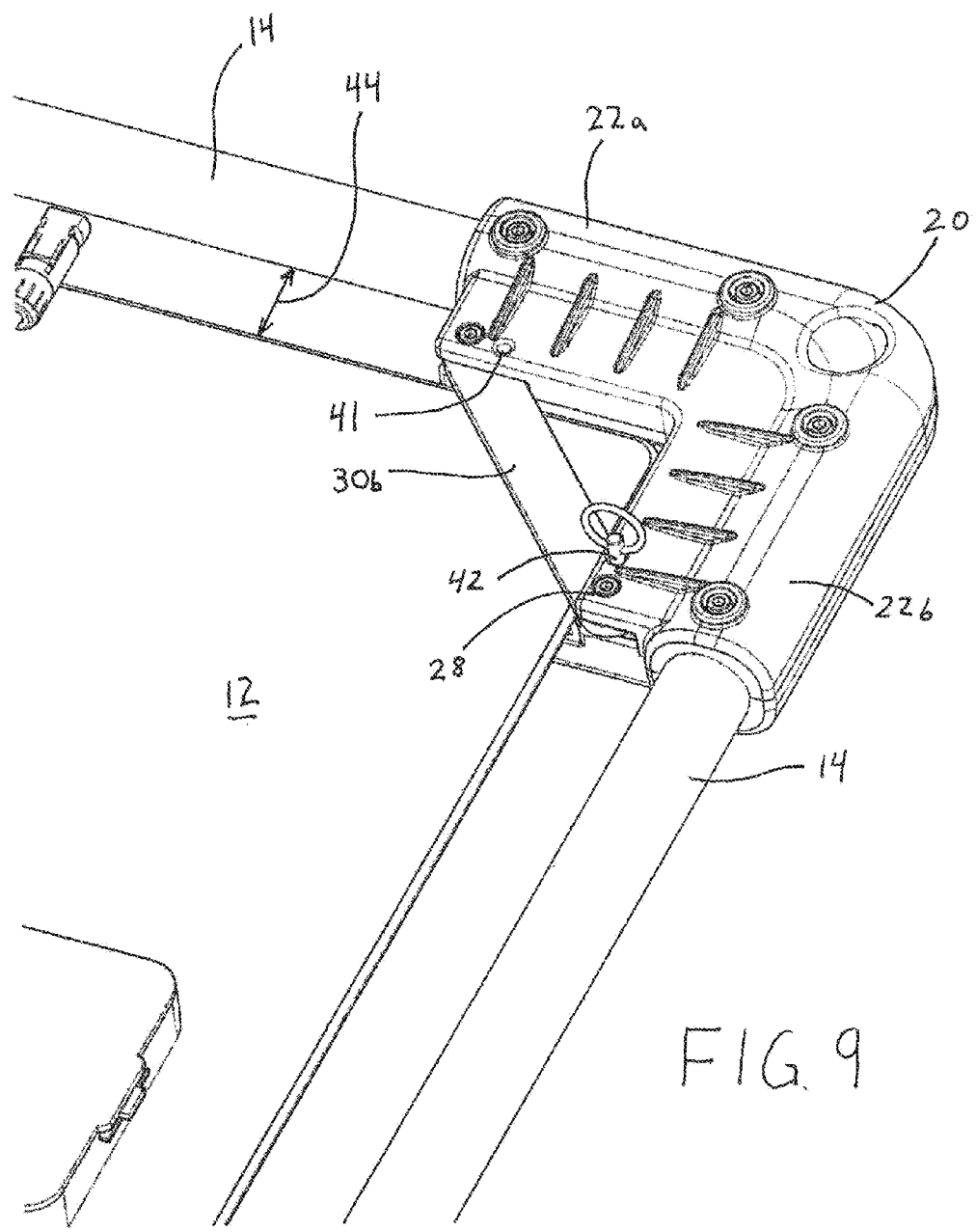
FIG. 9 is a detail perspective view of a connector having a movable fastening strap, with the fastening strap in the closed position.

The connectors 20 having the fixed fastening straps 30a may be located along the same side of the carrier 10. The opposite side of the carrier 10 may have connectors 20 including movable fastening straps 30b. The movable fastening straps 30b may be pivotably secured at one end to the connector 20. FIGS. 8 and 9 show the movable fastening straps 30b in an open position, where the non-pivotally secured end 34 of fastening strap 30*b* is swung away from the shelf 24 to allow a corner of the PV panel 12*b* to be seated on the shelf. Once the PV panel corner 12*b* is seated, the fastening strap 30*b* may be pivoted toward a closed position in which it extends in a generally diagonal direction across the corner of the PV panel as shown in FIG. 9. In the closed position, the fastening strap extends from joining portion 22*a* to the other joining portion 22*b* of the same connector 20. The non-pivotally secured end 34 of the fastening strap may include a generally C-shaped notch 36 and an aperture 38 formed adjacent to the notch. The notch 36 may be positioned such that in the closed position it surrounds one of the fasteners 28 used to hold the connecting member portion 20*a* and 20*b* together.

When the fastening strap 30*b* is in the closed position, the aperture 38 will align with a through hole 40 formed in the connector 20. A locking device, such as a pin 42, may then be inserted into the through hole 40 and the aperture 38 to hold the fastening strap 30*b* in the closed position. With the pin 42 inserted, movement of the fastening arm 30*b* is prevented and it is held in the closed position. Accordingly, the PV panel corner is securely retained in the carrier 10. In order to release the PV panel, the pins may then be removed from the through hole 40 to allow the fastening straps 30*b* to be pivoted to the open position.

Also, a further through hole 41 can be provided on the connector 20, close to the fastening strap 30*b* pivot point. This further through hole 41 can be used to receive the pin 42 when the fastening strap 30*b* is in the open position. Further, the pivoting end of the fastening strap 30*b* can be provided with a minor cut-out that lines-up with the through hole 41. Thus, placement of the pin 42 in the through hole 41 and that cut-out (not shown) would hold the fastening strap 30*b* in the open position. The pin may be in the form of a ring pin including a detent or a different type of pin that will hold each fastening strap 30*a*, 30*b* in a desired position.

Figure 12:
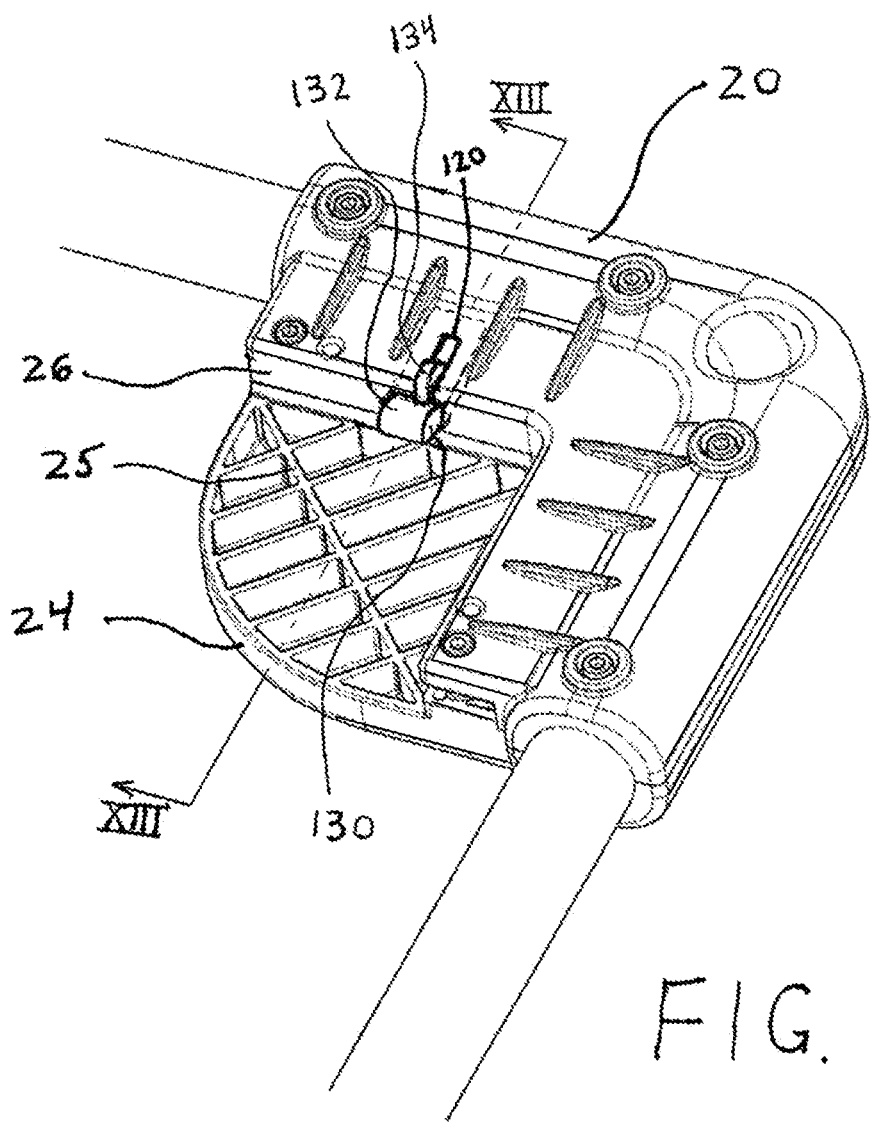
FIG. 12 is a detail perspective view of a connector showing an alternative embodiment of a PV panel fastening device.
Figure 13:
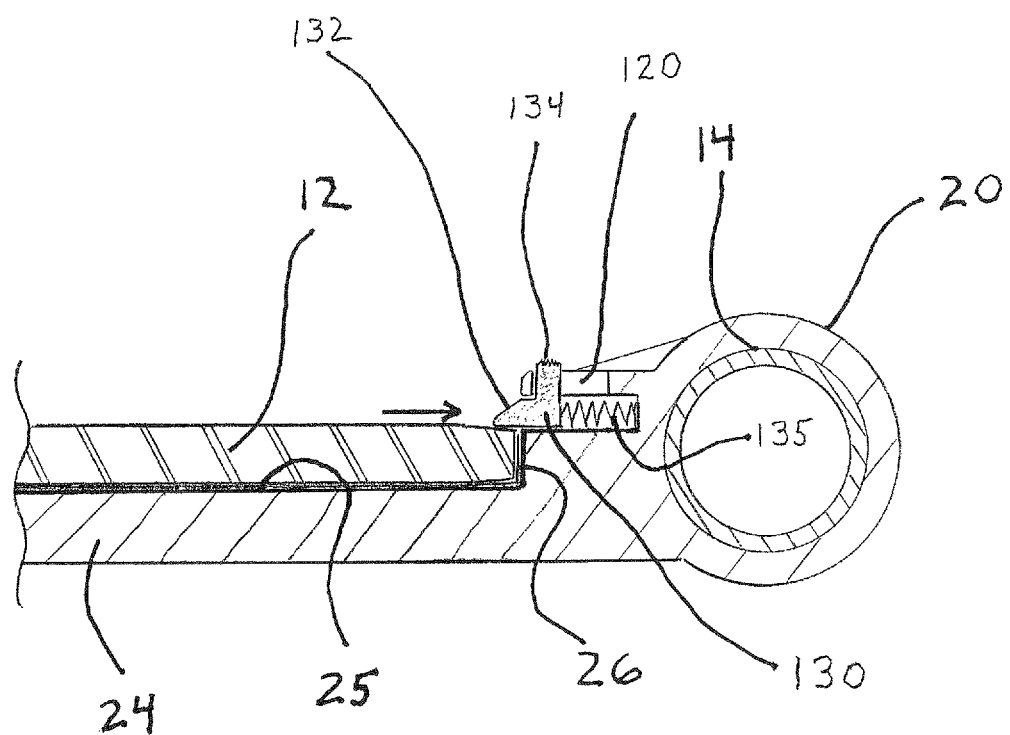
FIG. 13 is a cross-section view taken through line XIII-XIII of FIG. 12.

It is within the contemplation of the present invention that the fastening device could include a latch or clip or other latching device known in the art. For example with reference to FIGS. 12 and 13, the fastening device could be a built-in snap-lock system, that allows a panel 12 to snap onto the carrier 10 connectors 20 and be held securely virtually automatically. As shown in FIGS. 12 and 13, such a snap-lock system could include a detent 130 that is configured to protrude inwardly from the connectors 20 and thus hang over the panel 12 once seated on the shelf surface 25. Such a snap-lock detent 130 could be retractable for removing the panel, but biased by a spring 135 to return to the overhanging, locking position for holding down the panel 12. An angled upper surface 132 could be provided on an automatic snap-lock detent 130. The angled upper surface 132 would engage a panel being installed on the carrier 10, and translate the downward pressure applied to the angled surface 132 into a force that could slide the detent temporarily out of the way, until the panel sits on the shelf surface 25 and is below the detent 130, at which point the detent 130 would spring back into a locking position. The detent 130 could have a manual operation surface 134, which is guided within a slot 120. Alternatively, other manual and/or semi-automatic latches are contemplated. For example, an automatic latch could have a selectable release position so the panel 12 can be quickly removed without having to hold one or more latches open.

Thus, in accordance with aspects of the disclosed technologies, the PV carrier 10 includes two connectors at one end having a fixed fastening strap 30 and two connectors at the opposite end having pivotal fastening straps 30*b*. This arrangement allows for a PV panel to be easily secured in and removed from the carrier as needed.

Figure 7:
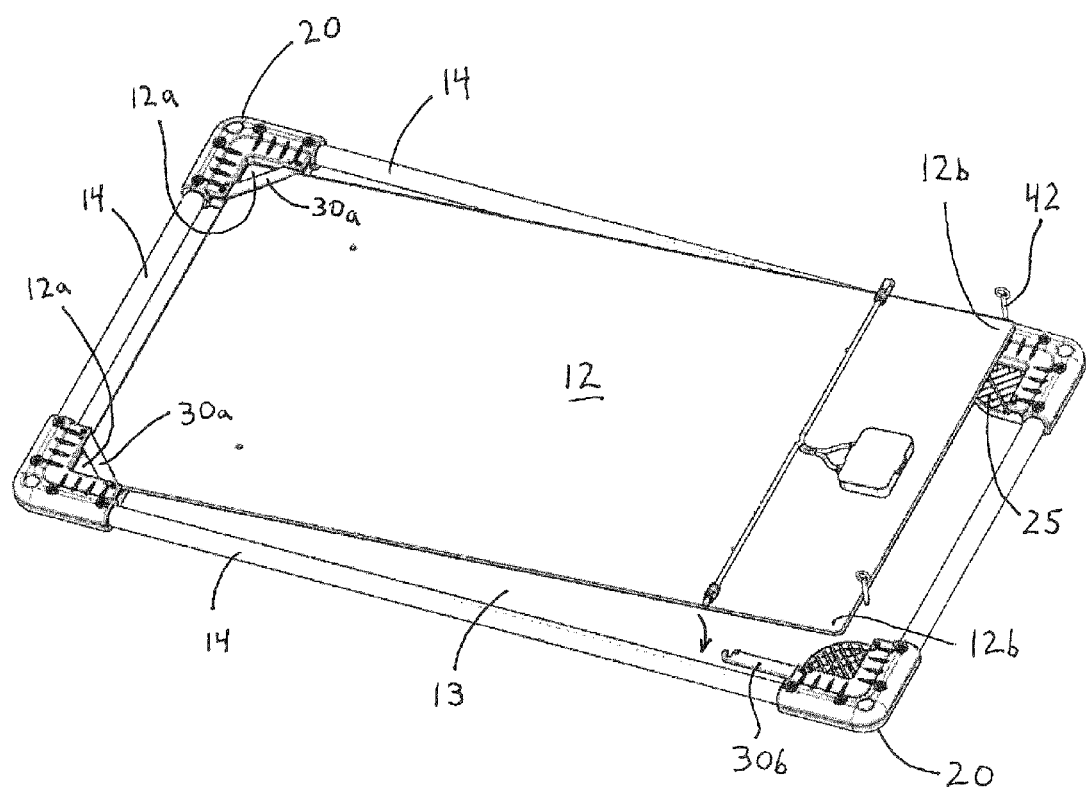
FIG. 7 is a top perspective view showing a PV panel being inserted into the carrier.

In operation, when a user desires to transport a PV panel, the panel may be secured in the PV carrier 10. To do this, the user should make sure the movable fastening straps 30*b* are in the open position, otherwise pivot them to the open position. The PV panel may the be slightly tilted with respect to the carrier 10, such that two PV panel corners 12*a* slide underneath the fixed fastening straps 30*a* as shown in FIG. 7. The PV panel 12 may then be lowered such that the remaining two corners 12*b* sit on the shelf 24 of the connectors 20 having the pivotable fastening straps 30*b*. With the PV panel being supported at all four corners by the shelves 24 of the connectors 20, the pivotal fastening straps 30*b* may be rotated from the open position into the closed position as shown in FIG. 9. Each pin 42 may then be inserted into the connector through hole and fastening strap aperture thereby locking the movable fastening straps 30*b* in the closed position. The PV panel 12 is now securely retained within the carrier 10.

The PV panel carrier 10 may be formed such that a separation 44 exists between the edges of the PV panel and the frame members 14. This separation permits a user to grab one of the frame members and place their fingers in the separation space between the PV panel and the frame member. Thus, each frame member 14 forms a handle-like element for carrying the frame. Also, since the frame completely surrounds the PV panel, a handle by which the carrier 10 can be easily grabbed is formed on all sides of the PV panel. Accordingly, a user can easily carry the device and also transfer it to another location. This greatly assists in transporting the PV panel 12 to the installation site. The frame members 14 also permit PV panels to be carried with one hand. In addition, a separate dedicated handle (nor shown) could be attached to one or more of the frame members to provide a holding member for a user to carry the carrier 10.

Figure 10:
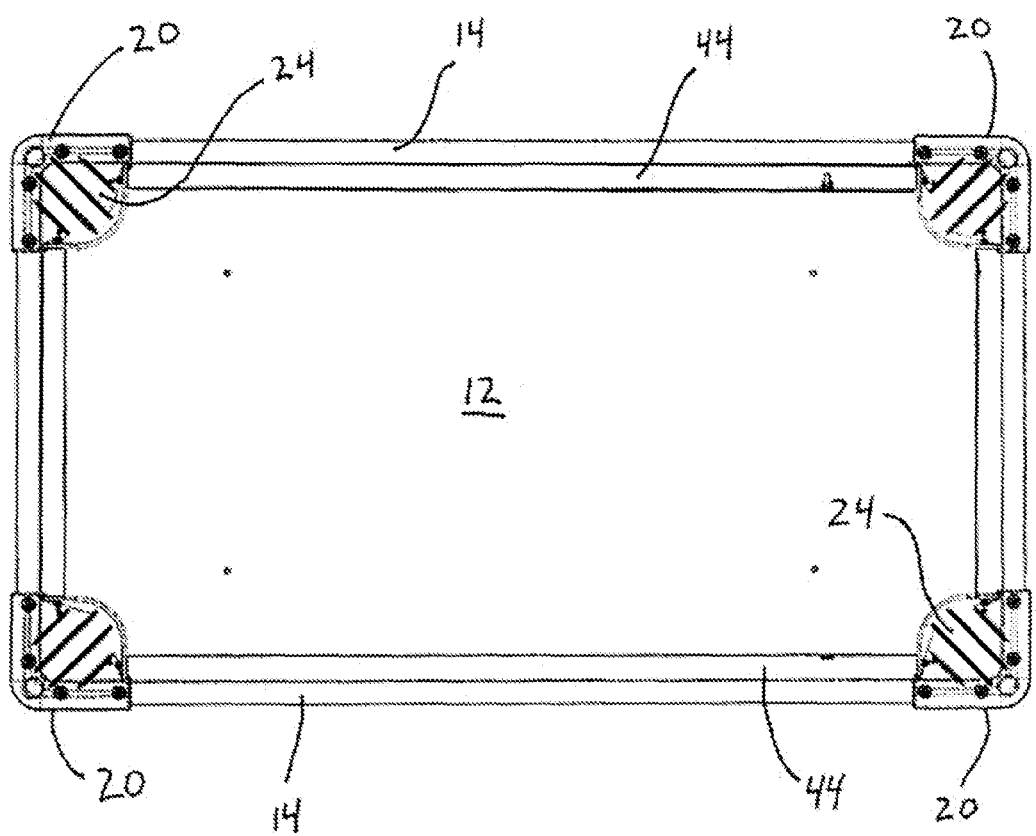
FIG. 10 is a top plan view of the carrier having a PV panel retainer therein.
Figure 11:
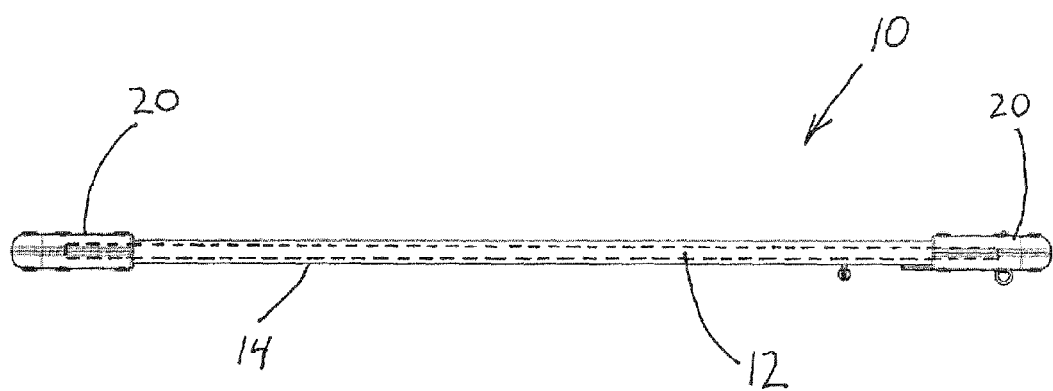
FIG. 11 is a side elevational view of the PV panel carrier having a PV panel retainer therein.

In addition, with reference to FIGS. 10 and 11, when the PV panel 12 is secured within the carrier 10, the panel's edges are protected by the frame members 14. As shown in FIG. 10, the interconnected frame members extend beyond the perimeter of the PV panel. As shown in FIG. 11, the frame members 14 have a thickness greater than the PV panel and therefore also extend above and below the PV panel. Thus, if the carrier 10 is placed on a generally flat surface, the PV panel will not contact that surface. Also, the connectors 20 and frame members 14 prevent the corners and edges from getting chipped or cracked.

It is within the contemplation of the present invention that the length and size of the frame members 14 and connectors 20 may be formed in different lengths in order to accommodate panels 12 of different sizes. Even if the length of the frame members is changed, the same connecting members 20 may be used. Accordingly, carriers of different sizes may be formed without the need to create a variety of specialized parts.

It will be appreciated that various of the above-disclosed features and functions, or alternatives thereof, may be desirably combined into many other different apparatus and systems. It will also be appreciated that various presently unforeseen or unanticipated alternatives, modifications, variations, or improvements therein may be subsequently made by those skilled in the art which are also intended to be encompassed by the disclosed embodiments and the following claims.

What is claimed is:

1. A PV panel carrier comprising:
    a plurality of elongate members joined by connecting members to form a frame, each of the connecting members including a support surface for supporting a portion of a PV panel thereon, each of the connecting members including a fastening strap extending over the support surface, at least two of the fastening straps are movable between an open position wherein the at least two of the fastening straps do not extend over the support surface and a closed position where the at least two of the fastening straps extend over the support surface to retain a PV panel in the carrier, and wherein the movable straps each have a first end pivotally secured to the connecting member and movable between an open and closed position, and the moveable straps each have a second end having an aperture formed therein which aligns with a through hole formed in the connecting member when the strap is in the closed position, and a pin extends through the aperture and through hole to selectively lock the strap in the closed position.

2. The PV panel carrier defined in claim 1, wherein at least two of the fastening straps are fixed at both ends to the connector over which the fastening strap extends.

3. The PV panel carrier defined in claim 1, wherein the fastening straps include rigid elongate members.

4. The PV panel carrier defined in claim 1, wherein at least one of the plurality of elongate members forms a handle for carrying the carrier.

5. The PV panel carrier defined in claim 1, wherein the elongate members are in the form of tubular members.

6. The PV panel carrier defined in claim 1, wherein the supports surfaces have a generally triangular configuration.

7. The PV panel carrier defined in claim 1, wherein the elongate members have a thickness greater than a PV panel retained within the carrier.

8. The PV panel carrier defined in claim 1, wherein the connecting members each have two joining portions for receiving and end of the elongate members, the joining portions being generally perpendicular to each other, the straps extending from one joining portion to the other generally diagonally across the support surface.

9. A PV panel carrier comprising:
a plurality of elongate members joined at corners by connecting members to form a frame, each of the members including a support surface for supporting a portion of a PV panel thereon, each of the connecting members including a fastening device extending over the support surface, wherein at least two of the fastening devices are movable between an open position wherein the at least two of the fastening devices do not extend over-the support surface and a closed position wherein the at least two of the fastening devices extend over the support surface to retain a PV panel in the carrier, wherein at least one of the movable fastening devices includes a rigid elongate member pivotally secured to the connecting member and pivotable between the open and closed position and is lockable in a closed position via a pin removably securable in the connecting members, and wherein the connectors are adapted to support the PV panel at a spaced distance from the elongate members, wherein a space is formed between the elongate members and edges of the PV panel, the spaced distance permits a user to grab one of the frame members and place their fingers in the space between the PV panel and the frame member.

10. The PV panel carrier defined in claim 9, wherein the elongate members and connectors are integrally formed as a common unitary construction.

11. A PV panel carrying apparatus comprising:
four elongate members; and
four connectors joining the four elongate members to form a frame, each connector fixedly securing two elongate members to form a corner of the frame, wherein the frame is sized to be generally the same proportionate shape as and larger than a panel to be carried, wherein the frame forms an inner region in which the panel is carried, the connectors each including a support surface that extends toward the inner region, wherein a panel carried by the frame will engage each of the support surfaces, each of the connectors including a fastening strap extending over the support surface, wherein at least two of the fastening straps are pivotal between an open position and a closed position, wherein in the open position the pivotal fastening strap does not extend over the support surface and in the closed position the pivotal fastening strap extends over the support surface, and wherein when carrying the panel a corner of the panel will be disposed between the support surface and the fastening strap, and wherein the connectors are adapted to support the PV panel at a spaced distance from the elongate members, wherein a space is formed between the elongate members and edges of the PV panel, the spaced distance permits a user to grab one of the frame members and place their fingers in the space between the PV panel and the frame member.

12. The PV panel carrying apparatus defined in claim 11, wherein at least two other of the fastening straps are immovably fixed to the connectors.

13. The PV panel carrying apparatus defined in claim 11, wherein the at least two pivotal fastening straps are selectively retained in the closed position by a locking device.

* * * * *